United States Patent [19]
Paptzun

[11] 3,913,610
[45] Oct. 21, 1975

[54] BUTTERFLY VALVE
[75] Inventor: George J. Paptzun, Cincinnati, Ohio
[73] Assignee: The Lunkenheimer Company, Cincinnati, Ohio
[22] Filed: Jan. 28, 1974
[21] Appl. No.: 437,206

[52] U.S. Cl. ............................................... 137/375
[51] Int. Cl.² ........................................... F16K 1/22
[58] Field of Search ................................. 137/375; 251/305–308

[56] References Cited
UNITED STATES PATENTS

| | | | |
|---|---|---|---|
| 2,387,013 | 10/1945 | Fuller | 137/375 X |
| 2,708,563 | 5/1955 | Backman et al. | 251/305 X |
| 3,118,465 | 1/1964 | Scaramucci | 251/308 X |
| 3,192,945 | 7/1965 | Blakeley | 137/375 |
| 3,318,567 | 5/1967 | Gifford | 251/306 |

Primary Examiner—Henry T. Klinksiek
Attorney, Agent, or Firm—Wood, Herron & Evans

[57] ABSTRACT

A butterfly valve including a tubular sleeve member formed of a relatively high-strength metal; a cast; a unitary valve housing member slidable over the sleeve; and a threaded member mounted in the housing operative to exert a radially directed pressure against the sleeve to rigidly attach the housing thereto, the threaded member also being effective to function as one pivot for a valve disc rotatably mounted within the sleeve.

10 Claims, 6 Drawing Figures

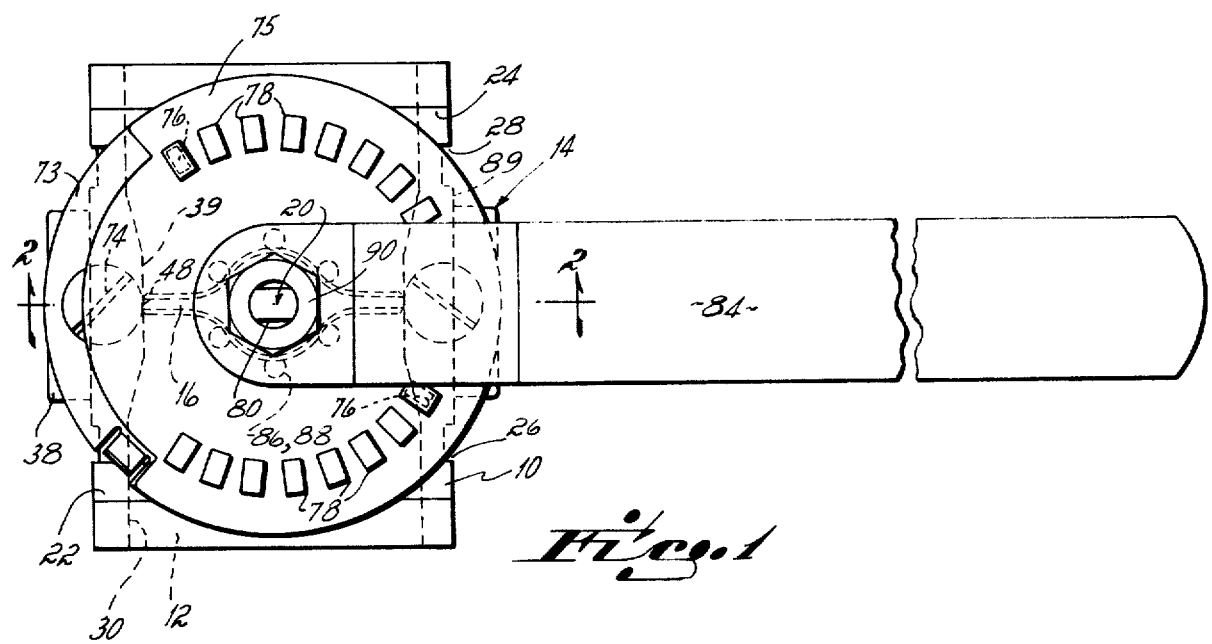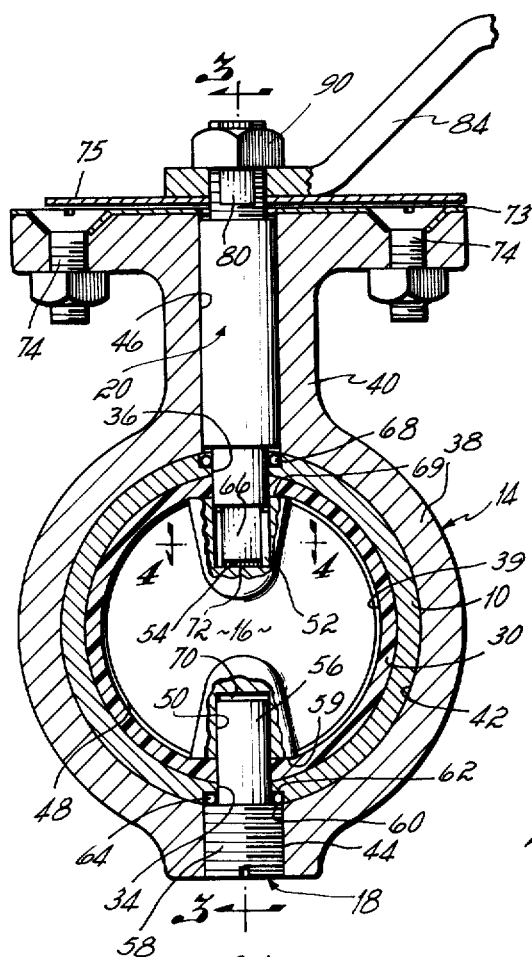

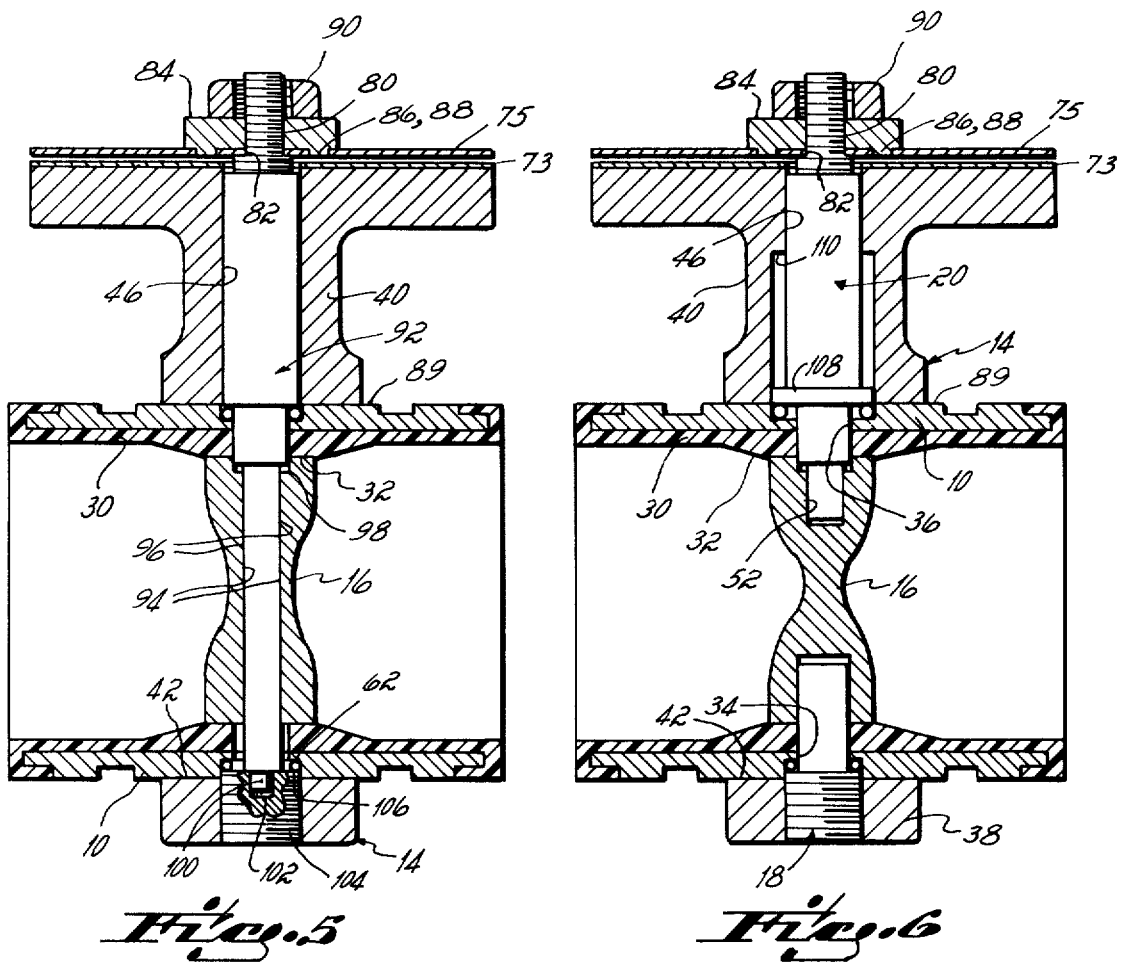

BUTTERFLY VALVE

This invention relates to valves and, particularly, to butterfly valves. More particularly, this invention is directed to a butterfly valve which is of very economical construction, but which nevertheless functions effectively in handling corrosive liquids and other fluids at line pressures as high as 150 to 200 psi.

In recent years, butterfly valves have found a wide range of uses in numerous industrial applications. Typical, commercially available butterfly valves include a valve housing having a passage for the flow of fluids, a rotatable valve disc for controlling the flow of fluids therethrough, and one or more stems for mounting the valve disc within the housing. While these valves have functioned properly, efforts to reduce their cost have not been totally successful. These manufacturing costs arise principally from the cost of the materials required and from the cost of machining and assembling the valve components. That is, in such valves the housing member must be formed of a relatively high-strength material, such as high-strength iron or steel or, in applications involving the flow of erosive or corrosive fluids, a high-strength, corrosion resistant material, such as stainless steel, bronze, or any of the nickel bearing alloys. Although the requirement for such high cost, corrosion resistant materials can be overcome by using either a corrosion resistant metallic or non-metallic liner, as is known in the art, the valve housing itself must still be constructed of a relatively high cost, high-strength material to withstand the line pressures experienced during operation. Furthermore, machining costs are increased by the use of high-strength materials. Moreover, the various valve components must be accurately machined for accurate alignment and assembly to provide a reliable, leakproof valve.

One method of producing a butterfly valve which seeks to reduce material, machining and assembly costs is disclosed in U.S. Pat. No. 3,192,945 to Blakeley. This method involves the use of a thin-walled pipe section formed of carbon steel, stainless steel, aluminum, brass or other suitable material through which a fluid flows. Clamped about the pipe section is a two-piece housing cast from such materials as malleable iron, aluminum, stainless steel, brass or other metal. The valve housing is formed as a pair of semi-cylindrical segments which are clamped in position about the pipe section and bolted together. This construction, however, has cost disadvantages resulting from the necessity to cast two separate housing segments, and then to accurately machine the separate segments to provide aligned openings therethrough for mounting of the valve stems. The cost of the valve is also increased by the need to align and mount the two housing sections on the pipe before the housing and pipe are fully secured in assembled relation.

It is accordingly the principal object of this invention to provide a reliable, simple and economical butterfly valve assembly having a minimum number of parts which achieves reductions in the cost of materials, machining and assembly.

This object and others are accomplished in accordance with the preferred embodiment of my invention by providing an improved butterfly valve assembly including a tubular sleeve member formed of a relatively high-strength material and having a pair of diametrically opposed openings in the wall thereof. The valve further includes a unitary cast valve housing member with a through opening for slidably receiving the sleeve member. The housing is provided with a pair of diametrically opposed bores adapted to be aligned with the openings in the sleeve member. An upper stem, attached to the valve handle, passes downwardly through aligned bores in the housing and sleeve. In a preferred embodiment, this stem is received in a flat-walled opening in a generally circular valve disc rotatable with the sleeve member. A threaded member is receivable in the lower bores of the housing and includes a shoulder portion adapted to engage the wall of the sleeve member to exert a radially directed pressure between the housing member and the sleeve member for rigidly attaching the housing member thereto. This threaded member further includes a stem which extends through the lower opening in the sleeve and engages a bore in the lower portion of the valve disc. The valve disc is thus supported between the stems for rotatable movement between a valve "open" and a valve "closed" position.

Other objects and advantages of my invention will be apparent from the following detailed description of the invention, reference being had to the accompanying drawings, in which:

FIG. 1 is a top view of a preferred form of valve constructed in accordance with my invention;

FIG. 2 is a cross-sectional view taken along line 2—2 of FIG. 1;

FIG. 3 is a cross-sectional view taken along line 3—3 of FIG. 2;

FIG. 4 is a cross-sectional view taken along line 4—4 of FIG. 2;

FIG. 5 is a vertical sectional view showing a modified embodiment of the invention; and FIG. 6 is a vertical sectional view showing a second modified embodiment of the invention.

Referring now to FIGS. 1, 2 and 3, it may be seen that the one preferred valve constructed in accordance with the present invention is a grooved-end valve comprising a tubular sleeve member 10 having a passage 12 for the flow of fluids therethrough, a unitary valve housing member 14 encompassing the sleeve 10, a valve disc 16 mounted within the sleeve and a pair of opposed valve stems 18 and 20 for rotatably supporting the valve disc 16 within the sleeve member 10 and for securing valve components in assembled relationship.

The tubular sleeve member 10 is adapted to be interposed in a conduit (not shown). Suitable gasket coupling members (not shown, but well known in the art) couple the ends 22, 24 of sleeve 10 to the conduit. Accordingly, the sleeve member 10 is provided with a pair of circumferential exterior grooves 26, 28 spaced inwardly from the outer ends 22, 24 thereof for receiving the key sections of the annular clamping members. Although this is the preferred embodiment, other known forms of attachment, such as flanged or threaded ends, may be employed.

The sleeve member 10 is also provided with an internal resilient lining 30 formed of such materials as rubber or synthetic rubber material to provide the sleeve 10 with erosion and/or corrosion protection. The lining 30 extends around the ends 22, 24 of the sleeve 10 to similarly protect the ends and includes a portion of reduced internal diameter forming a valve seat 32, 39 for the valve disc 16. Substantially centrally located between the grooves 26, 28 are a pair of diametrically opposed openings 34 and 36 through which the valve stems 18 and 20 pass, respectively, as will hereinafter be more fully explained.

Encompassing the sleeve 10 is the valve housing member 14 which comprises a main body portion 38 and a bonnet portion 40 extending radially of the main body portion. The main body portion 38 has a circular opening 42 passing axially therethrough, the diameter of which is slightly larger than the outer diameter of the sleeve 10. When the valve is in its assembled condition, opening 42 receives a cylindrical portion 89 of the sleeve member. This facilitates the assembly and disassembly of the valve housing 14 on the sleeve 10 as the housing is easily slidable onto and off of the sleeve. Extending substantially centrally through the main body portion 38 and through the bonnet portion 40 are a pair of diametrically opposed bores 44 and 46, respectively, which extend radially to the sleeve 10 and, on assembly of the valve housing 14 on the sleeve 10, are aligned with the openings 34 and 36, respectively, in the wall of the sleeve 10. As will be more fully explained hereinafter, the bore 44 in the main body portion 38 of the housing 14 is internally threaded.

Mounted within the sleeve 10 is the valve disc 16 which, as may be seen in FIG. 2, has a circular outline when viewed in the flat, except for the two flatted portions 59 and 69 on opposite diameters. Disc 16 includes a slightly tapered peripheral edge 48 seatable on the circular valve seating portion 39 of the lining 30 with the flatted portions 59, 69 being seatable on 32, 79. The flatted and circular portions are blended together to provided a substantially leakproof seal in the valve closed position. The valve disc 16 includes a pair of diametrically opposed recesses 50 and 52 formed in the peripheral flats 59, 69 thereof for receiving the inner ends of the valve stems 18 and 20, respectively. The upper recess 52 has a pair of opposed flats, or parallel side walls, 54 interconnected by arcuate wall portions, the walls 54 extending in the direction of the plane of the disc 16, as shown in FIG. 4.

The valve disc 16 is rotatably mounted on the lower stem member 18 which is substantially cylindrical in shape. Member 18 comprises a stem portion 56, which extends into the recess 50, an externally threaded portion 58 and a shoulder 60 therebetween. The threaded portion 58 of the stem member 18 is adapted to mate with the internal threads in bore 44 of the main body portion 38 of valve housing 14. The opening 34 through the wall of the sleeve member also includes a shoulder 62 which is adapted to engage the shoulder 60 of the stem 18, whereby on tightening of the stem 18 in the housing 14 a radially directed pressure is applied between the sleeve 10 and the housing 14 to rigidly lock the housing 14 on the sleeve 10. If desired, a suitable O-ring seal 64 may be interposed and compressed between the interengaging shoulders 62 and 60 of the sleeve wall and the stem to provide a secondary seal against leakage of fluid, as shown in FIGS. 2 and 3.

Mounted within the bore 46 extending through the bonnet portion 40 of the valve housing 14 is the upper, substantially cylindrical stem member 20 formed with a pair of opposed flats 66 at the end thereof. The stem 20 is rotatably mounted within the bore 46 and extends into the recess 52 in the valve disc 16 with the flats 66 engaging the parallel side walls 54 in the recess 52 (FIG. 4) whereby the valve disc 16 is pivotable between an open position and a position substantially closing the valve by rotation of the stem 20. In like manner, as described in connection with the lower stem 18, a suitable O-ring seal 68 can be interposed between the stem 20 and the wall of the sleeve 10 to provide a secondary seal against fluid leakage.

It is to be noted that the stems 18 and 20 do not extend fully into the recesses 50 and 52. Rather, spaces 70 and 72, respectively, remain open at the ends thereof. This allows the valve disc 16 to move slightly along the vertical axis of the stems in a direction perpendicular to the longitudinal axis of the sleeve to ensure positive seating of the valve disc 16 on the valve seat 32. However, the disc is restrained by the stem and the flats on the disc from any sideways or rocking movement, thereby assuring a complete peripheral seal between the disc and liner in the closed position of the disc.

At the respective opposite end of the stem 20 is mounted a mechanism for positioning the stem 20 and, accordingly, the valve disc 16 in an open position, a closed position and a number of throttled positions therebetween. This mechanism constitutes no part of the present invention and is described in detail in the pending patent application of Joseph J. Haddad, Jr., Ser. No. 437,191, filed concurrently herewith.

Briefly, however, the valve disc positioning mechanism includes a first, or lower, disc 73 rigidly attached to the bonnet portion 40 of the housing 14 by means of suitable bolts 74 and a second upper, flexible disc 75 mounted thereabove. The lower disc 73 contains a pair of circumferentially spaced, upwardly extending detents 76 disposed on opposite sides of stem 20. The upper disc 75 contains a plurality of corresponding detents 78 spaced equally about the circumference of a circle. These latter detents define a valve open position, a valve closed position, and a number of partially throttled positions in which the valve disc is held at various angles with respect to the axis of passageway 12. The upper flexible disc 75 is mounted for rotation with stem 20 by a pair of flats 80 on the stem end which are engageable with cooperating flats 82 in the upper disc. The disc 75 and stem 20 are rotatable by means of a handle 84 which includes a plurality of equally spaced, depending projections 86 which fit into corresponding openings 88 in the disc 75. The handle 84 is secured to the stem 20 by means of a bolt 90.

On rotation of the handle 14, the upper disc 75 flexes upwardly under the camming action of the detents 76 in the disc 73 and rotates with the handle until a desired valve position is reached, whereupon the detents 78 engage the detents 76, thus holding the valve 16 in the desired position.

Although the assembly of the valve components and the nature of the operation of the valve assembly will be apparent to those skilled in the art from the foregoing description, a few comments may be made regarding some of the principal features of my invention. The tubular sleeve member 10 of the valve assembly of this invention is effective to withstand independently of the housing member 14 the internal pressure in the conduit to which the valve is connected. Since this pressure can be of the order of 150 to 200 psi, the sleeve 10 is formed of a relatively high-strength metal in comparison to the strength of the metal forming the housing. When erosive or corrosive fluids are to be handled by the valve and no liner is to be used, the sleeve may be formed of a high-strength material having erosion and/or corrosion resistance. High strength materials such as steel, stainless steel, and the like, are readily available in tube form. The grooves in the sleeve can be formed by rolling so that the only machining required is that of the radially opposed openings 34 and 36. Thus, the sleeve member can be fabricated at a very low cost. It will be appreciated that grooves 26, 28 can be machined if desired.

Since the sleeve is effective to withstand the internal pressure of the fluid with no pressure component being applied to the housing, the housing may be inexpensively cast of a relatively low strength material, such as cast gray iron, or of a light alloy, such as aluminum. In addition to the economies achieved by forming the substantial bulk of the valve assembly by an inexpensive casting method and of a relatively inexpensive material, savings are achieved in the machining operation since the material from which the valve housing is constructed is substantially easier to machine than high-strength, high alloy materials. Also, the bore of the housing and the outside diameter of the sleeve do not require a close fit, making it possible to use an "as cast" housing bore 42 and commercial tubing in which the outside diameter of portion 89 is subject to conventional tube tolerances.

Further, in relation to machining and to assembly of the valve components, it will be appreciated that since the valve housing is a unitary structure, the radially opposed bores 44 and 46 in the housing may be drilled simultaneously in one operation or while the housing is in a single fixture. (Bore 44 also requires threading.) The same is true of radially opposed bores 34 and 36 in the sleeve. Accordingly, it is a relatively simple matter to achieve alignment of the holes in the sleeve and valve housing during assembly. With these holes in alignment, valve stems 18 and 20 may be quickly and easily inserted and the valve disc mounted thereon, thus providing quick and easy assembly of the valve with no misalignment difficulties being encountered. Thereafter, the valve stem 18 is tightened to bear against the sleeve wall, thus rigidly attaching the housing to the sleeve and locking the principal valve components in assembled relationship.

Referring now to FIG. 5, there is shown an alternative embodiment of the invention wherein the valve disc 16 is supported and rotated by single, one-piece stem 92 rather than a pair of opposing stems. In this embodiment, the one-piece stem 92 is rotatably mounted in the cylindrical bore 46 through the bonnet portion 40 of the valve housing 14 and includes a pair of opposed flats 94 substantially centrally located along the length of the stem 92 which are adapted to engage a like pair of opposed flats 96 within a bore 98 passing through the valve disc 16 along a diameter. The stem 92 includes a substantially cylindrical portion 100 at the end thereof which is adapted to be received in a recess 102 in an externally threaded member 104 and to rotate therein. The threaded member 104 includes a flat end portion 106 which is adapted to engage the shoulder 62 in the wall of the sleeve 10 in like manner as described above to exert a radial pressure between the sleeve 10 and the housing 14 to rigidly lock the housing and sleeve together.

Referring now to FIG. 6, an alternative form of the invention is illustrated, which means are provided for preventing "blow out" of the upper stem. In this embodiment, the stem 20 is provided with a shoulder portion 108 which is engageable with a shoulder 110 in the bore 46 passing through the bonnet portion 40 of the valve housing 14. On assembly of the valve, the stem 20 is mountable by insertion from the interior of the valve housing, that is, through the axial opening 42 of the main body portion 38 thereof. In this construction the distance separating the interengageable shoulders 108 and 110 is greater than the distance between the outside wall 89 of the sleeve 10 and the end of the stem 20 extending into the recess 52.

As is known in the art, with the pressures that are exerted on the valve disc, if the closure mechanism at the top of the stem 20 should become released, the dynamic forces within the valve exerted against the stem 20 will cause the stem 20 to be "blown" outwardly from the valve. In prior art valves, this can cause a highly dangerous condition. In the present construction shown in FIG. 6, this "blow out" of the stem is prevented by means of the interengageable shoulders 108 and 110. That is, if the stem should be forced outwardly, it can move upwardly only to the point where the shoulder 108 of the stem 20 contacts the shoulder 110 of the bore 46. This releases the valve disc from its support and prevents the valve stem from being propelled from the housing.

Although my invention has been described in terms of certain preferred embodiments, it will be recognized by those skilled in the art that other forms may be adopted within the scope of the invention. Thus, for example, it is contemplated that valves of the configurations shown in either FIG. 2 or FIG. 5 can be fabricated by casting a valve housing member 14 about a tubular sleeve 10. In such a modified construction, the contraction of the housing member about the sleeve provides a shrink fit which further functions to hold the housing and sleeve in assembled relationship. It will be appreciated that in such an embodiment the housing material must have a lower melting point and a higher coefficient of expansion than the tube material. One combination of materials which has proved satisfactory for such a construction is a sleeve formed of zinc-plated steel and a valve housing formed of a cast aluminum alloy. Accordingly, I desire to be limited only by the scope of the following claims.

What is claimed is:

1. A valve assembly for controlling the flow of fluids comprising, in combination:

a tubular sleeve member providing a passage for the flow of fluids therethrough adapted for connection at its outer ends in a conduit and having a pair of diametrically opposed openings in the wall thereof located intermediate said ends;

a unitary valve housing member mounted upon and surrounding said sleeve between said ends, said housing member including a main body portion having a circular opening axially therethrough of a diameter larger than the diameter of said sleeve member such that said valve housing member is slidable onto said sleeve member, and a bonnet portion extending radially of said main body portion and of said sleeve, said valve housing member having first and second diametrically opposed bores extending through said main body portion and said bonnet portion, respectively, radially of said sleeve member and being aligned with said openings in said sleeve member, said first bore being internally threaded;

a valve disc pivotally mounted within the passage of said sleeve member, said valve disc being rotatable between an open position and a position closing said passage;

an externally threaded member threadably engaging said first bore and having an inwardly facing shoulder portion, said shoulder portion on said threaded member being effective to exert a radially directed pressure on said sleeve to rigidly lock said housing member in position on said sleeve, said threaded member further having a support portion in alignment with a first opening in said sleeve, said last named support portion rotatably supporting said valve disc;

upper stem means rotatably mounted in said second bore and extending radially inwardly through the second opening in said sleeve, said upper stem means being received in an opening in said valve disc and being effective to support said valve disc, said upper stem means having a flat portion, a cooperating flat portion being formed in the opening of said disc and extending parallel to the flat portion of said stem, said cooperating flat portions being effective to cause pivotal movement of said disc upon rotation of said upper stem means.

2. The valve of claim 1 in which said sleeve is effective to withstand the fluid pressure in said passage and said housing member is of a cast material of substantially lower strength than said sleeve member.

3. The valve assembly of claim 2 wherein said disc is slidable with respect to said stem means along the axis of said stem means in a direction perpendicular to the longitudinal axis of said sleeve member.

4. The valve of claim 1 in which the support portion of said threaded member comprises a substantially cylindrical stem and said disc includes a bore receiving said cylindrical stem.

5. The valve of claim 1 in which the support portion of said threaded member includes a bearing recess and said disc is mounted on a stem rotatably engaging said bearing recess.

6. The valve of claim 5 in which said stem means extends completely across said disc and engages said support portion.

7. The valve assembly of claim 1 wherein said sleeve member includes a resilient lining, a portion of said lining having a reduced internal diameter forming a valve seating portion.

8. The valve of claim 1 in which said upper stem means includes a shoulder portion engageable with a like shoulder portion in said second bore, the distance separating said interengageable shoulders being greater than the distance between the wall of said sleeve member and the end of said upper stem means extending through said second opening in said sleeve.

9. The valve of claim 1 further comprising a shoulder on said upper sleeve means, a plate having an opening receiving said valve stem means, said plate being secured to said valve housing and engaging said shoulder to retain said stem within said housing.

10. A valve assembly for controlling the flow of fluids comprising, in combination:

a tubular sleeve member providing a passage for the flow of fluids therethrough adapted for connection at its outer ends in a conduit and having a pair of diametrically opposed openings in the wall thereof located intermediate said ends;

a unitary valve housing member mounted upon and surrounding said sleeve between said ends, said housing member including a main body portion having a circular opening axially therethrough, said opening receiving said sleeve member, and a bonnet portion extending radially of said main body portion and of said sleeve, said valve housing member having first and second diametrically opposed bores extending through said main body portion and said bonnet portion, respectively, radially of said sleeve member and being aligned with said openings in said sleeve member, said first bore being internally threaded;

a valve disc pivotally mounted within the passage of said sleeve member, said valve disc being rotatable between an open position and a position closing said passage;

an externally threaded member rotatably engaging said first bore, said threaded member having a support portion in alignment with a first opening in said sleeve, said last named support portion rotatably supporting said valve disc;

upper stem means rotatably mounted in said second bore and extending radially inwardly through the second opening in said sleeve, said upper stem means being received in an opening in said valve disc and being effective to support said valve disc, said upper stem means having a flat portion, a cooperating flat portion being formed in the opening of said disc and extending parallel to the flat portion of said stem, said cooperating flat portions being effective to cause pivotal movement of said disc upon rotation of said upper stem means;

said housing member being formed of a material with a lower melting point and higher coefficient of expansion than said sleeve, said housing member being cast in place about said sleeve and being shrunk-fit about said sleeve, whereby said housing member is rigidly held in position about said sleeve.

* * * * *